US009847179B2

(12) United States Patent
Poltorak et al.

(10) Patent No.: US 9,847,179 B2
(45) Date of Patent: *Dec. 19, 2017

(54) SOLID ELECTROLYTIC CAPACITOR AND METHOD OF MANUFACTURING A SOLID ELECTROLYTIC CAPACITOR

(71) Applicant: Kemet Electronics Corporation, Simpsonville, SC (US)

(72) Inventors: Jeffrey Poltorak, Simpsonville, SC (US); Brandon K. Summey, Simpsonville, SC (US); Yongjian Qiu, Simpsonville, SC (US)

(73) Assignee: KEMET Electronics Corporation, Simpsonville, SC (US)

( * ) Notice: Subject to any disclaimer, the term of this patent is extended or adjusted under 35 U.S.C. 154(b) by 497 days.

This patent is subject to a terminal disclaimer.

(21) Appl. No.: 14/182,400

(22) Filed: Feb. 18, 2014

(65) Prior Publication Data

US 2014/0160633 A1   Jun. 12, 2014

Related U.S. Application Data

(62) Division of application No. 13/238,037, filed on Sep. 21, 2011, now Pat. No. 8,842,418.

(Continued)

(51) Int. Cl.
*H01G 9/028* (2006.01)
*H01G 9/00* (2006.01)
(Continued)

(52) U.S. Cl.
CPC ............ *H01G 9/0029* (2013.01); *B05D 1/18* (2013.01); *B29C 59/16* (2013.01);
(Continued)

(58) Field of Classification Search
CPC .......... H01G 9/028; H01G 9/012; H01G 9/08; H01G 9/04; H01G 9/15; H01G 9/145; H01G 9/052; H01G 9/14
(Continued)

(56) References Cited

U.S. PATENT DOCUMENTS 3,345,545 A   10/1967   Bourgault et al.
4,794,491 A   12/1988   Saiki
(Continued)

FOREIGN PATENT DOCUMENTS

CN   101663719   3/2010
GB   2168383   6/1986
(Continued)

OTHER PUBLICATIONS

D.E. Tallman et al. Direct Electrodeposition of Polypyrrole on Aluminum and Aluminum Alloy by Electron Transfer Mediation, Journal of the Electrochemical Society, 149(3) C173-179 (2002).

(Continued)

*Primary Examiner* — Nguyen Ha
(74) *Attorney, Agent, or Firm* — Joseph T. Guy; Perkins Law Firm, LLC

(57) ABSTRACT

Provided is a method for forming a capacitor. The method includes:
providing an anode with a dielectric thereon and a conductive node in electrical contact with the anode;
applying a conductive seed layer on the dielectric;
forming a conductive bridge between the conductive seed layer and the conductive node;
applying voltage to the anode;
electrochemically polymerizing a monomer thereby forming an electrically conducting polymer of monomer on the conductive seed layer; and (Continued)

disrupting the conductive bridge between the conductive seed layer and the conductive node.

17 Claims, 5 Drawing Sheets

Related U.S. Application Data

(60) Provisional application No. 61/384,785, filed on Sep. 21, 2010.

(51) Int. Cl.
| | | |
|---|---|---|
| *H01G 9/042* | (2006.01) | |
| *H01G 9/15* | (2006.01) | |
| *B05D 1/18* | (2006.01) | |
| *B29C 59/16* | (2006.01) | |
| *C23C 18/12* | (2006.01) | |
| *H01G 9/048* | (2006.01) | |

(52) U.S. Cl.
CPC ......... *C23C 18/1216* (2013.01); *H01G 9/028* (2013.01); *H01G 9/048* (2013.01); *H01G 9/0425* (2013.01); *H01G 9/15* (2013.01); *Y10T 29/41* (2015.01); *Y10T 29/417* (2015.01); *Y10T 29/43* (2015.01)

(58) Field of Classification Search
USPC .................. 361/532, 523, 525, 528–529
See application file for complete search history.

(56) References Cited

U.S. PATENT DOCUMENTS

| | | | |
|---|---|---|---|
| 4,812,951 A | 3/1989 | Melody et al. | |
| 5,185,075 A | 2/1993 | Rosenberg et al. | |
| 5,390,074 A * | 2/1995 | Hasegawa ............... | H01G 9/012 29/25.03 |
| 5,716,511 A | 2/1998 | Melody et al. | |
| 5,949,639 A | 9/1999 | Maeda et al. | |
| 6,191,936 B1 | 2/2001 | Webber et al. | |
| 6,368,363 B1 | 4/2002 | Kobatake et al. | |
| 6,480,371 B1 | 11/2002 | Kinard et al. | |
| 6,798,644 B1 | 9/2004 | Piller et al. | |
| 6,906,912 B2 * | 6/2005 | Arai ..................... | H01G 9/0036 29/25.03 |
| 6,962,612 B1 | 11/2005 | Saito et al. | |
| 7,116,548 B2 | 10/2006 | Satterfield, Jr. et al. | |
| 7,154,742 B1 | 12/2006 | Hahn et al. | |
| 7,157,326 B2 * | 1/2007 | Suda ..................... | H01G 9/0036 29/25.03 |
| 7,342,775 B2 | 3/2008 | Hahn et al. | |
| 7,554,793 B2 * | 6/2009 | Chacko ................. | H01G 9/012 29/25.01 |
| 7,563,290 B2 | 7/2009 | Oiu et al. | |
| 8,035,953 B2 | 10/2011 | Nemoto et al. | |
| 8,259,436 B2 | 9/2012 | Petrzilek et al. | |
| 8,295,032 B2 | 10/2012 | Sugawara et al. | |
| 8,310,816 B2 | 11/2012 | Chacko | |
| 8,503,165 B2 | 8/2013 | Chacko et al. | |
| 8,848,342 B2 * | 9/2014 | Uher ..................... | H01G 9/028 361/525 |
| 8,971,020 B2 * | 3/2015 | Biler ...................... | C25D 9/02 361/503 |
| 2004/0231119 A1 * | 11/2004 | Brenneman .......... | H01G 9/0036 29/25.03 |
| 2008/0254269 A1 | 10/2008 | Freeman et al. | |
| 2009/0059479 A1 * | 3/2009 | Yamashita ............. | H01G 9/012 361/540 |
| 2010/0165547 A1 | 7/2010 | Kuranuki | |
| 2012/0069493 A1 | 3/2012 | Poltorak et al. | |
| 2014/0168859 A1 * | 6/2014 | Poltorak ................ | H01G 9/028 361/528 |

FOREIGN PATENT DOCUMENTS

| | | |
|---|---|---|
| JP | H02 178912 | 7/1990 |
| JP | 05-21296 | 1/1993 |
| JP | 05-090094 | 4/1998 |
| JP | 3104246 | 10/2000 |
| JP | 2001-217160 | 8/2001 |
| JP | 4325354 | 9/2009 |
| WO | WO 2007-130234 | 11/2007 |
| WO | WO 2008-036909 | 3/2008 |
| WO | WO 2012/040292 | 3/2012 |

OTHER PUBLICATIONS

Sang Min Lee, PCT/US2011/052496, International Search Report and Written Opinion of the International Searching Authority, dated Apr. 25, 2012.

ISA/KR; International Search Report and Written Opinion of the International Searching Authority: PCT/US2014/017027; Applicant: Kemel Electronics Corporation; dated May 26, 2014.

ISA/KR; International Search Report and Written Opinion of the International Searching Authority; PCT/US2014/017114; Applicant: Kemel Electronics Corporation; dated May 26, 2014.

* cited by examiner

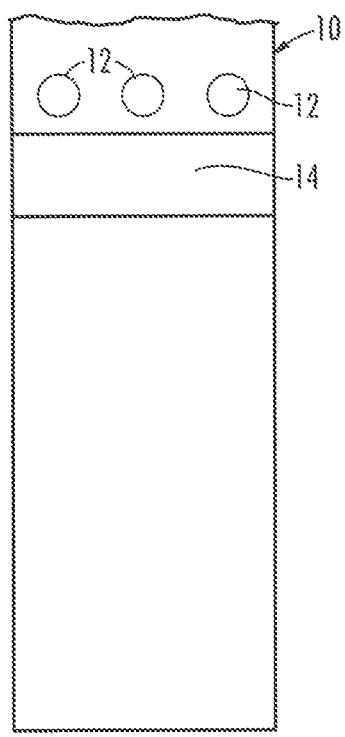

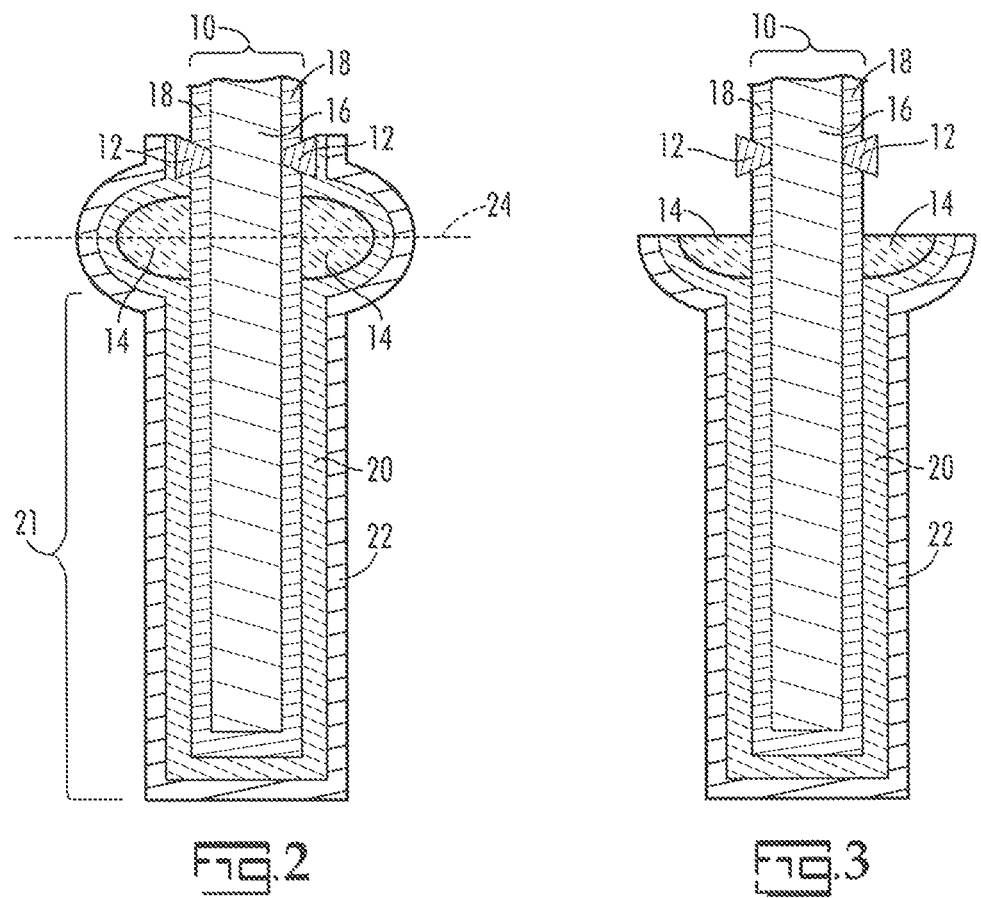

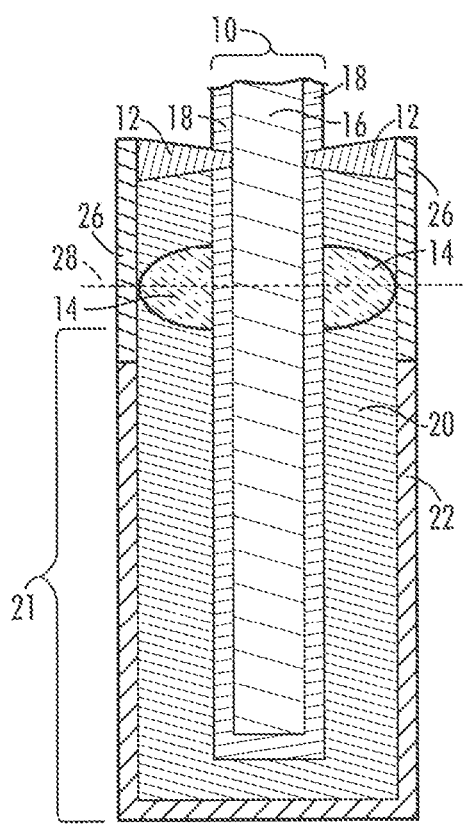 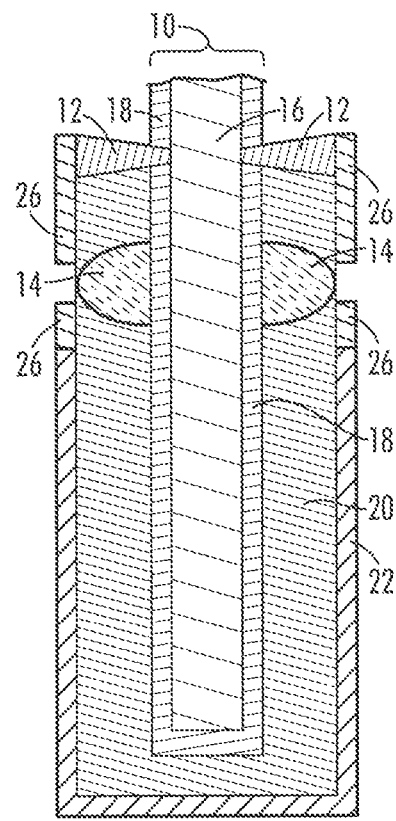

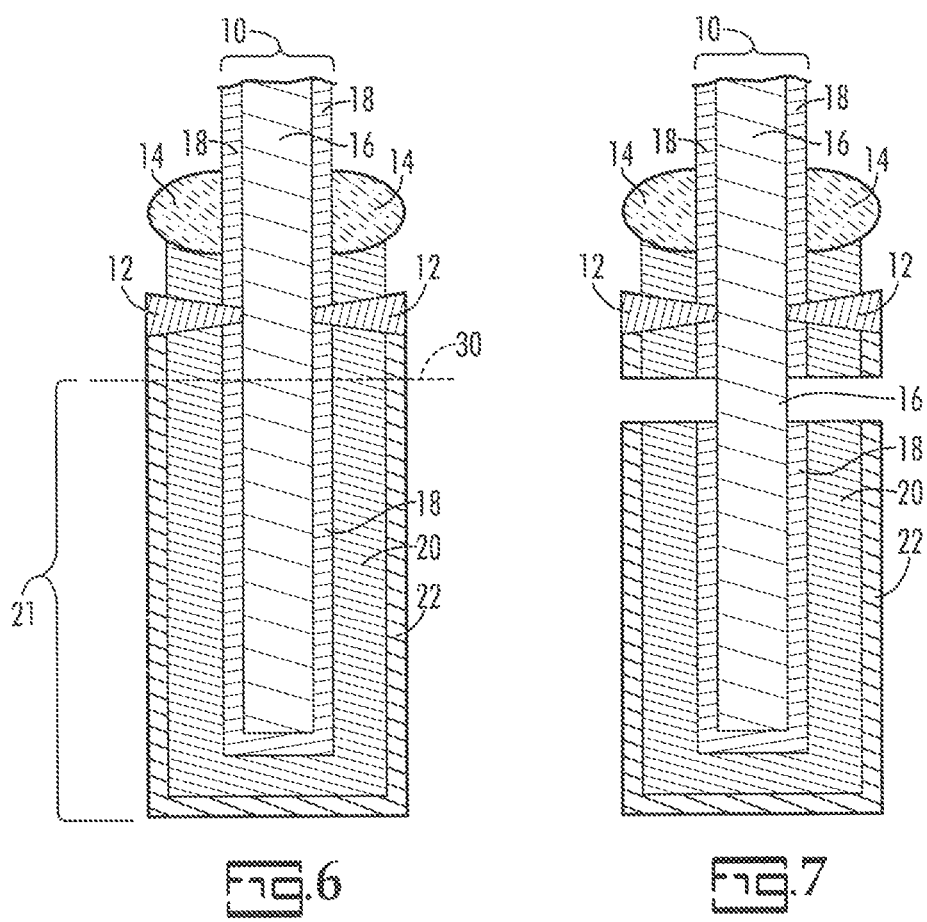

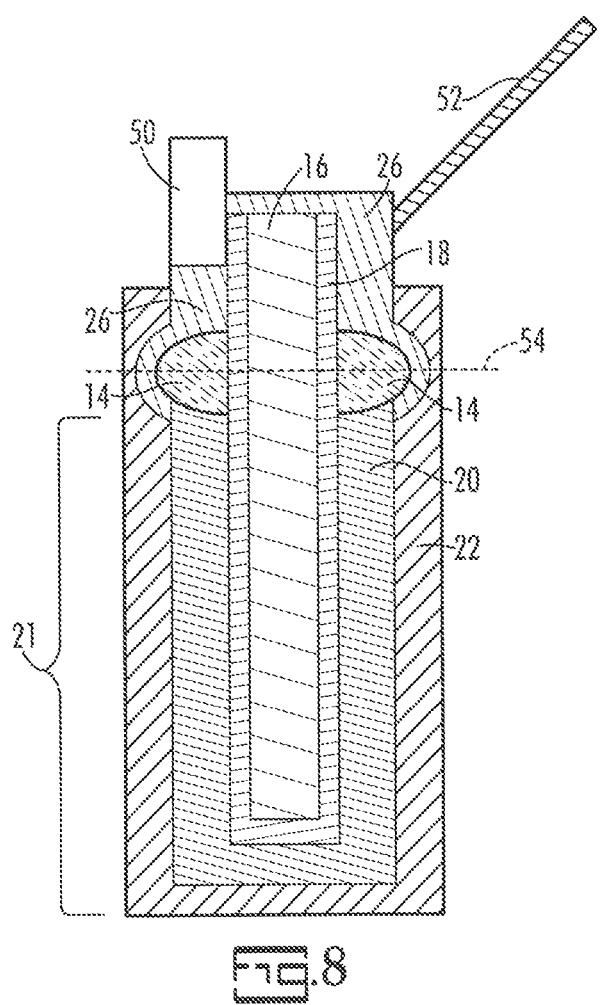

SOLID ELECTROLYTIC CAPACITOR AND METHOD OF MANUFACTURING A SOLID ELECTROLYTIC CAPACITOR

CROSS-REFERENCE TO RELATED APPLICATIONS

The present application is a divisional application of pending U.S. patent Ser. No. 13/238,037 filed Sep. 21, 2011 which in turn claims priority to U.S. Provisional Patent Appl. No. 61/384,785 filed Sep. 21, 2010, both of which is are incorporated herein by reference.

BACKGROUND

The present invention is related to a solid electrolytic capacitor and a method of manufacturing a solid electrolytic capacitor. More specifically, the present invention is related to a method of forming a conductive bridge for improved formation of a cathode comprising an electrochemically polymerized intrinsically conducting polymer.

Solid electrolytic capacitors are well known in the art. Solid electrolytic capacitors comprising an intrinsically conductive polymeric cathode are also well known. A particular problem with solid electrolytic capacitors comprising an intrinsically conducting polymeric cathode is the cost of manufacturing, variation in polymer coverage and the buildup, or thickness, within each part and from part to part. Manufacturing cost is associated with two things. One is the repetitive number of dip/dry cycles required for chemical in-situ polymerization which is required to achieve sufficient coverage. The other is the cost and complexity of the equipment with the current methods of electrochemical polymerization.

Due to the highly resistive nature of the dielectric it is difficult to form the polymeric coating by passing current through the dielectric from the anode. To avoid this problem a conductive seed layer is typically formed on the dielectric then an external electrical contact is placed in contact with the conductive seed layer. This arrangement typically requires complex hardware or limits product design to those that allow for the external connection. The traditional external connection methods have a high potential for damage to the active surface of the element. This damage occurs in current manufacturing methods which require a direct physical contact between the external hardware and the conductive seed layer. The external hardware is incompatible with the dielectric and physical damage to the dielectric and/or polymeric cathode layer is common. Damage to the polymeric cathode layer may result in insufficient polymer coverage of the dielectric, that could lead to subsequent cathode layers damaging the dielectric properties, or subsequent processing damage of the exposed dielectric.

The present invention provides a very efficient method of forming a conductive polymeric coating whereby the external electrical contact is improved by the process of electrically separating the external electrical contact from the active cathode region of the element. This is accomplished without detrimental impact on the polymer quality, either physically or electrically, or the underlying dielectric and anode layers.

SUMMARY

It is an object of the invention to provide an improved solid electrolytic capacitor.

It is another object of the invention to provide a method of forming a solid electrolytic capacitor which is more efficient and which mitigates the problems of capacitor formation commonly realized in the art.

These and other advantages, as will be realized, are provided in a method for forming a capacitor. The method includes:
providing an anode with a dielectric thereon and a conductive node in electrical contact with the anode;
applying a conductive seed layer on the dielectric;
forming a conductive bridge between the conductive seed layer and the conductive node;
applying voltage to the anode;
electrochemically polymerizing a monomer thereby forming an electrically conducting polymer of monomer on the conductive seed layer; and
disrupting the conductive bridge between the conductive seed layer and the conductive node.

Another embodiment is provided in a method for forming a capacitor including:
providing an anode with a dielectric thereon and a conductive node in electrical contact with the anode;
forming an insulator on the dielectric;
applying a conductive seed layer on the dielectric;
forming a conductive bridge between the conductive seed layer and the conductive node;
applying voltage to the anode;
electrochemically polymerizing a monomer thereby forming an electrically conducting polymer of monomer on the conductive seed layer; and
disrupting the electrical conductivity between the conductive seed layer and conductive node.

Yet another embodiment is provided in a method for forming a capacitor comprising:
providing a process carrier;
providing an anode attached to the process carrier wherein the anode comprises a dielectric thereon;
applying a conductive seed layer on the dielectric;
forming a conductive bridge between the conductive seed layer and the process carrier;
applying voltage to the process carrier;
electrochemically polymerizing a monomer thereby forming an electrically conducting polymer of the monomer on the conductive seed layer; and
disrupting the conductive bridge between the conductive seed layer and the process carrier.

Yet another advantage, as will be realized, is provided in a method for forming a capacitor. The method includes:
providing an anode comprising a dielectric thereon;
applying a conductive seed layer on the dielectric;
forming a conductive bridge between the conductive seed layer and an external electrical contact;
applying voltage to the external electrical contact;
electrochemically polymerizing a monomer thereby forming an electrically conducting polymer of monomer on the conductive seed layer; and
disrupting the connection of the conductive bridge between the conductive seed layer and the external electrical contact.

Yet another embodiment is provided in a method for forming a capacitor. The method includes:
providing an anode with a dielectric on the anode and a conductive node in electrical contact with the anode;
forming a conductive path between the conductive node and an active cathode region wherein the active cathode region is on the dielectric;
applying voltage to the anode;

electrochemically polymerizing a monomer thereby forming an electrically conducting polymer of the monomer in the active cathode region; and disrupting the conductive path between the conductive node and the active cathode region.

BRIEF DESCRIPTION OF FIGURES

FIG. 1 is a top schematic view of an embodiment of the invention.

FIG. 2 is a cross-sectional schematic view of an embodiment of the invention.

FIG. 3 is a cross-sectional schematic view of an embodiment of the invention.

FIG. 4 is a cross-sectional schematic view of an embodiment of the invention.

FIG. 5 is a cross-sectional schematic view of an embodiment of the invention.

FIG. 6 is a cross-sectional schematic view of an embodiment of the invention.

FIG. 7 is a cross-sectional schematic view of an embodiment of the invention.

FIG. 8 is a cross-sectional schematic view of an embodiment of the invention.

DESCRIPTION

The present invention is related to an improved solid electrolytic capacitor and a method of manufacturing a solid electrolytic capacitor. More specifically, the present invention is related to a capacitor with an improved conductive polymeric cathode and an improved method of forming the conductive polymeric cathode.

The invention will be described with reference to the figures which form an integral, non-limiting, component of the disclosure. Throughout the various figures similar elements will be numbered accordingly.

An embodiment of the invention will be described with reference to FIG. 1 which is a schematic top view of a film, 10, with an anode and a dielectric thereon. At least one conductive node, 12, and preferably a plurality of conductive nodes, is in electrical contact with the anode and in one embodiment the conductive nodes extend outward through the dielectric from the anode. An insulator, 14, is illustrated the purpose of which will be further described herein.

An embodiment of the invention is illustrated in cross-sectional schematic view in FIG. 2. In FIG. 2, a film comprising an anode, 16, with a dielectric, 18, thereon is represented collectively at 10. The conductive node, 12, is in electrical contact with the anode, 16. A conductive seed layer, 20, forms a conductive film preferably over the entire dielectric and insulator, 14, and the conductive seed layer is in direct electrical contact with the conductive node. As would be realized, voltage applied to the anode passes through the anode, the conductive node and throughout the conductive seed layer thereby providing a charge over the surface of the dielectric. Current does not pass directly through the dielectric since the dielectric has higher resistance than the conductive node. The conductive polymer, 22, is formed by in-situ electrochemical polymerization of a monomer onto the surface of the conductive seed layer. The conductive polymer, 22, is formed in at least the active cathode region, 21. After the conductive polymer is formed the conductivity between the anode and the conductive polymer is disrupted within the boundaries of the insulator, 14, such as along dotted line 24, resulting in two conductive layers separated by a dielectric thereby forming a capacitor.

For the purposes of discussion the anode is designated as 16 throughout the specification with the cathode opposite the dielectric from the anode. One of skill in the art would realize that this is for convenience and the anode and cathode could be exchanged either physically or by reverse mounting the capacitor, if valve metals are not used, thereby changing the terminology, with regards to convention, without departing from the scope of the invention. In this embodiment the conductive seed layer is acting as both the conductive seed layer and a conductive bridge. The embodiment of FIG. 2 after disruption, such as by laser ablation, is illustrated in cross-sectional schematic view in FIG. 3.

An embodiment of the invention is illustrated in cross-sectional schematic view in FIG. 4. In FIG. 4, the anode, 16, with a dielectric, 18, thereon are taken together at 10. The conductive node, 12, is in electrical contact with the anode, 16. A conductive seed layer, 20, forms a conductive film preferably over the entire dielectric and at least to the insulator, 14. The insulator may function as a dam with the conductive seed layer terminating at the insulator or, alternatively, the conductive seed layer may extend to, and even past, the conductive node, 12, thereby covering the conductive node. A conductive bridge, 26, which is a coating, extends from and forms an electrical contact between the conductive seed layer, 20, and the conductive node thereby forming a conductive path from the anode, through the conductive node and bridge to the conductive seed layer. The conductive path through the conductive node and conductive bridge has lower resistance than the conductive path through the dielectric. Voltage is applied thereby forming a conductive polymer, 22, in at least the active cathode region, 21. After formation of the conductive polymer the conductivity of the bridge is disrupted within the bounds of the insulator, such as at 28, thereby electrically separating the anode from the conductive polymer as illustrated in FIG. 5.

An embodiment of the invention is illustrated in cross-sectional schematic view in FIG. 6. In FIG. 6 the anode, 16, with a dielectric, 18, thereon are taken together as 10. An insulator, 14, prohibits the conductive seed layer, 20, from migrating up the dielectric thereby terminating the conductive seed layer at the insulator. A conductive node, 12, forms an electrical contact between the anode and the conductive seed layer, 20, thereby establishing a favorable path of electrical conduction since the path through the dielectric has higher resistance. After formation of the conductive polymer layer, 22, in at least the active cathode region, 21, the electrical conductivity between the anode and the conductive polymer is disrupted, such as at line 30, thereby forming a capacitor with electrically isolated conductive layers with a dielectric there between as illustrated in FIG. 7.

An embodiment of the invention is illustrated in cross-sectional schematic view in FIG. 8. In FIG. 8, the anode, 16, with a dielectric, 18, thereon. A conductive seed layer, 20, is formed on the dielectric preferably terminating at an insulator, 14. A conductive bridge, 26, provides an electrical connection between the conductive seed layer, 20, and at least one of a process carrier, 50, or an external electrical connection, 52. Voltage is applied to either the process carrier or the external electrical connection and a conductive polymer layer, 22, is formed by in-situ electrochemical polymerization of a monomer, in at least the active cathode region, 21. After the conductive polymer layer is complete the conductivity of the conductive bridge is disrupted, preferably at 54, thereby forming an electrolytic capacitor.

The electrical conductivity can be disrupted by any method suitable for disrupting current flow through a conducting layer or element. The disruption can be done by, but not limited to, removal, destruction, oxidation, vaporization, abrasion, ablation, chemical treatment, thermal treatment, etc. A particularly preferred method for disrupting the current flow is laser ablation wherein conductive material is treated with a laser thereby removing, by ablation or vaporization, material treated thereby. Furthermore, the heat of ablation may locally oxidize the conductive polymer, or the equivalent thereof, thereby rendering that portion of the polymer which is oxidized non-conductive.

The conductive bridge is a coated material which forms a path of electrical conductivity with a resistance which is lower than the resistance of the dielectric, and preferably with a resistance of no more than $10^4 \Omega$, with the path of electrical conductivity, typically but not limited to, spanning between the conductive node and the conductive seed layer. The conductive seed layer promotes electrochemical polymerization on the dielectric, over the conductive seed layer, without adverse reaction with the dielectric. The conductive bridge is composed of a material with properties common to existing cathodic materials, in that, the material is compatible with the dielectric, in terms of low leakage current properties and protective aspects, and exhibits those same properties even while remaining in contact with the dielectric during product operation. Particularly preferred materials for use in the conductive bridge are manganese dioxide and conducting polymer. While not limited thereto, a conductive polymer which is the same as the conductive polymer being formed over the conductive seed layer is preferred due to manufacturing simplicity and certainty of compatibility. The conductive polymer bridge can be formed by in-situ polymerization or by application of a polymer slurry followed by drying.

The conductive node is a region that forms a path with an electrical resistance which is lower than the electrical resistance through the dielectric. The conductive node can be a current path through the dielectric, a semi-conductor, or a conductor and most preferably the conductive node is conductive. The resistivity of the conductive node is preferably no more than $10^4 \Omega$ and even more preferably no more than $10^2 \Omega$. It is preferable that the conductive node comprises a material, or is coated with a material, which prevents the formation of oxides in the presence of moisture during current flowing through the conductive node. Noble metals, stainless steel and carbon are mentioned as particularly suitable for demonstration of the invention.

The insulator material is preferably a polymer selected from an epoxy, a polyimide, a polyamide, a siloxane, and a silicone. The insulator provides two functions. One function of the insulator is to act as a dam whereby wicking of monomer, or any solution, is prohibited beyond the insulator. Another function is to provide a buffer between the disruption of electrical conductivity and the dielectric. For example, when the electrical disruption occurs over the insulator a portion of the insulator can remain without detriment thereby mitigating any potential detrimental effects of laser impingement on the dielectric.

For the purposes of the present invention a direct electrical contact is defined as an electrical contact between two components in physical contact. An indirect electrical contact is defined as an electrical contact between two components with a conductor, such as conductive adhesive, there between.

The conductive seed layer is preferably a thin layer of a conductive material such as manganese dioxide or a conductive polymer. The conductive seed layer may be a seed layer which spreads the charge over a portion of the dielectric thereby improving the formation of in-situ electrochemically formed conductive polymer. Manganese dioxide can be used in the form of islands wherein the islands are electrically connected by conductive polymer as the conductive polymer grows. Alternatively, the manganese dioxide can cover the entire underlying surface. A thin layer of conductive polymer, and most preferably the same conductive polymer as that being formed on the conductive seed layer, can be used. The thin layer of conductive polymer for the conductive seed layer can be formed by dip coating with polymer slurry or by in-situ polymerization.

The anode preferably includes a valve metal or a conductive oxide of a valve metal with aluminum, tantalum, niobium, titanium, hafnium, zirconium, zinc, tungsten, bismuth, antimony and niobium oxide being mentioned as particularly suitable for demonstration of the instant invention. Niobium, tantalum, aluminum, and NbO are particularly preferred as the anode.

The dielectric is preferably an oxide of the anode without limit thereto. The formation of dielectrics on an anode, and particularly a valve metal anode, is widely documented and well understood in the art and further elaboration herein is not warranted. The active cathode region is the region of the capacitive element that is to be coated by the in-situ electrochemically polymerized polymer. In the included embodiments this is typically covered by the conductive seed layer to promote even growth of the in-situ electrochemically polymerized polymer, though is not defined by the conductive seed layer, as the conductive seed layer may extend beyond, or have less coverage, than that of the active cathode region. The active cathode region is also preferred to be in contact with the surface of the anode dielectric.

The cathode layer is a conductive layer preferably comprising conductive polymer, such as polythiophene, polyaniline, polypyrrole or their derivatives, manganese dioxide, lead oxide or combinations thereof. An intrinsically conducting polymer is most preferred.

A particularly preferred conducting polymer is illustrated in Formula I:

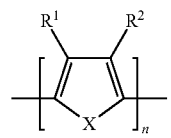

FORMULA 1

$R^1$ and $R^2$ of Formula 1 are chosen to prohibit polymerization at the β-site of the ring. It is most preferred that only α-site polymerization be allowed to proceed. Therefore, it is preferred that $R^1$ and $R^2$ are not hydrogen. More preferably, $R^1$ and $R^2$ are α-directors. Therefore, ether linkages are preferable over alkyl linkages. It is most preferred that the groups are small to avoid steric interferences. For these reasons $R^1$ and $R^2$ taken together as —O—$(CH_2)_2$—O— is most preferred. In Formula 1, X is S or N and most preferable X is S.

$R^1$ and $R^2$ independently represent linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR^3$; or $R^1$ and $R^2$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$alkylbenzyl, $C_1$-$C_4$ alkoxybenzyl or halobenzyl, 5-, 6-, or 7-membered heterocyclic structure containing two oxygen elements. $R^3$ preferably represents hydrogen, linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl.

The conducting polymer is preferably chosen from polypyrroles, polyanilines, polythiophenes and polymers comprising repeating units of Formula I, particularly in combination with organic sulfonates: A particularly preferred polymer is 3,4-polyethylene dioxythiophene (PEDT).

The manganese dioxide layer is preferably obtained by immersing an anode element in an aqueous manganese nitrate solution. The manganese oxide is then formed by thermally decomposing the nitrate at a temperature of from 200 to 350° C. in a dry or steam atmosphere. The anode may be treated multiple times to insure optimum coverage.

As typically employed in the art, various dopants can be incorporated into the polymer during the polymerization process. Dopants can be derived from various acids or salts, including aromatic sulfonic acids, aromatic polysulfonic acids, organic sulfonic acids with hydroxy group, organic sulfonic acids with carboxylhydroxyl group, alicyclic sulfonic acids and benzoquinone sulfonic acids, benzene disulfonic acid, sulfosalicylic acid, sulfoisophthalic acid, camphorsulfonic acid, benzoquinone sulfonic acid, dodecylbenzenesulfonic acid, toluenesulfonic acid. Other suitable dopants include sulfoquinone, anthracenemonosulfonic acid, substituted naphthalenemonosulfonic acid, substituted benzenesulfonic acid or heterocyclic sulfonic acids as exemplified in U.S. Pat. No. 6,381,121 which is included herein by reference thereto.

Binders and cross-linkers can be also incorporated into the conductive polymer layer if desired. Suitable materials include poly(vinyl acetate), polycarbonate, poly(vinyl butyrate), polyacrylates, polymethacrylates, polystyrene, polyacrylonitrile, poly(vinyl chloride), polybutadiene, polyisoprene, polyethers, polyesters, silicones, and pyrrole/acrylate, vinylacetate/acrylate and ethylene/vinyl acetate copolymers.

It is preferred to include a dopant in the polymer. The dopant can be coated separately or included in the monomer solution. A particularly preferred dopant is the sodium salt of polystyrenesulfonate (PSS).

To enhance subsequent connectivity to external termination, such as a lead frame, adhesion layers may be applied to the conductive polymer layer. The adhesion layers typically include a carbon containing layer and a metal containing layer such as a silver or nickel containing layer. The outermost layer is preferably a layer which is solderable such as a nickel layer or a silver layer deposited such as by vapor deposition.

The present invention has been described with particular reference to stated embodiments without limit thereto. One of skill in the art would realize additional embodiments, alternatives and improvements which are not specifically stated but which are within the metes and bounds of the claims appended hereto.

The invention claimed is:

1. A capacitor comprising:
   an anode;
   a dielectric on said anode;
   a disrupted conductive bridge between an external electrical connection and an active cathode region wherein said active cathode region is on said dielectric and said external electrical connection is not in said active cathode region;
   an electrochemical polymer on said active cathode region; and
   a conductive node in electrical contact with said anode and said disrupted conductive bridge.

2. A capacitor of claim 1 wherein said active cathode region comprises a conductive seed layer.

3. A capacitor of claim 2 wherein said conductive seed layer comprises a material selected from manganese dioxide and a conductive polymer.

4. A capacitor of claim 1 wherein said conductive bridge comprises said conductive seed layer.

5. A capacitor of claim 4 wherein said conductive bridge is said conductive seed layer.

6. A capacitor of claim 1 further comprising:
   an insulator on said dielectric.

7. A capacitor of claim 6 wherein said conductive bridge extends over said insulator.

8. The capacitor of claim 6 wherein said conductive bridge is disrupted over said insulator.

9. A capacitor of claim 1 wherein said conductive bridge is electrically connected to a process carrier.

10. A capacitor of claim 1 wherein said disruption of said conductive bridge comprises laser ablation.

11. A capacitor of claim 1 wherein said conductive bridge comprises a material selected from manganese dioxide and conductive polymer.

12. A capacitor of claim 1 wherein said disruption of said electrical conductivity comprises disruption of conductivity of said conductive bridge.

13. A capacitor of claim 1 wherein said anode is selected from the group consisting of a valve metal and a conductive oxide of a valve metal.

14. A capacitor of claim 13 wherein said anode is selected from the group consisting of aluminum, tantalum, niobium and NbO.

15. The capacitor of claim 1 wherein said disrupted conductive bridge is a disrupted electrical path between said anode and said conductive node.

16. The capacitor of claim 1 wherein said disrupted conductive node comprises a material that is a conductive, non-valve metal.

17. The capacitor of claim 1 wherein said conductive node comprises a material selected from a noble metal, stainless steel and carbon.

* * * * *